United States Patent Office 3,344,616
Patented Oct. 3, 1967

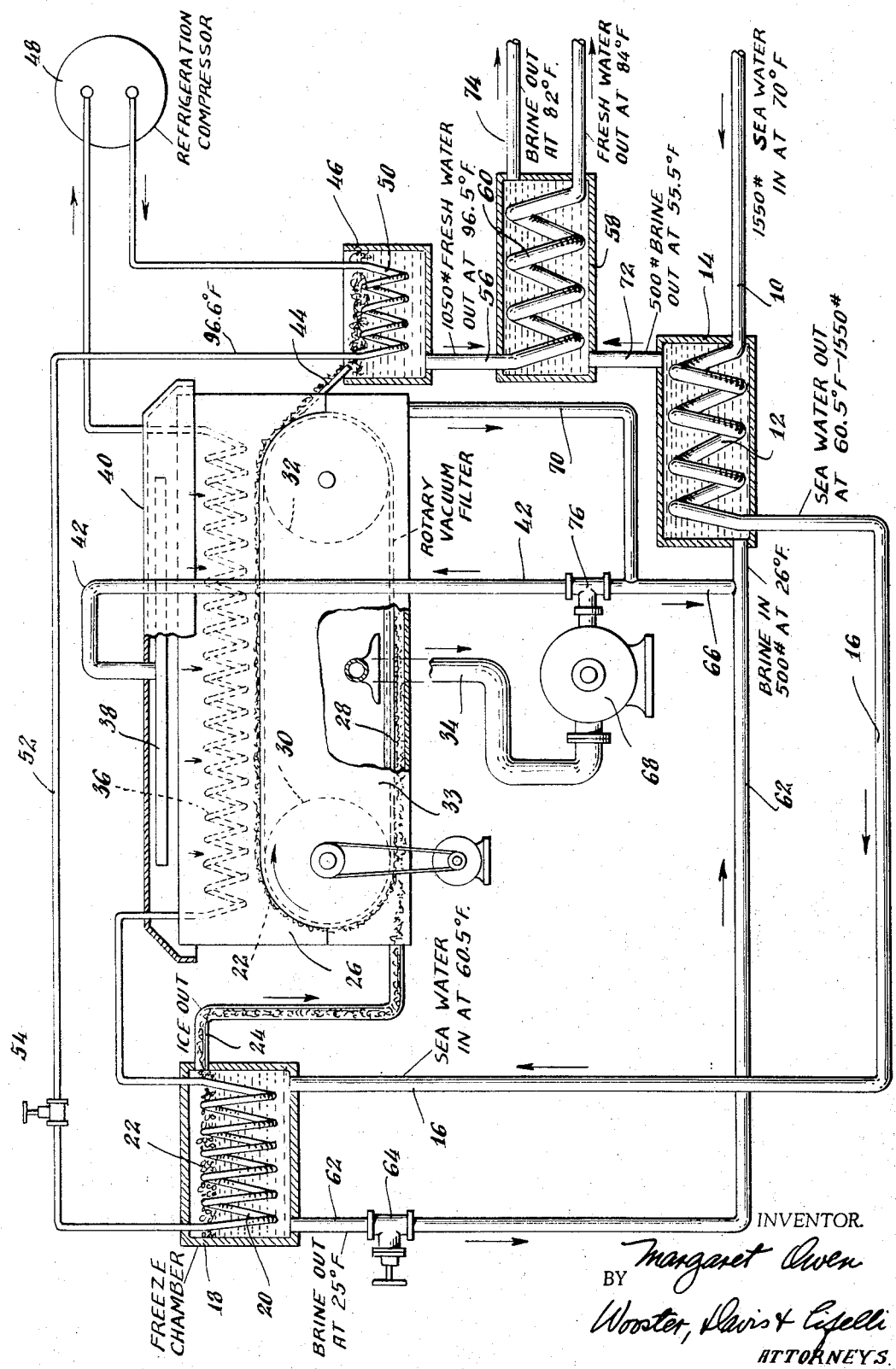

3,344,616
DESALINIZATION
Margaret Louise Owen, 18 Prospect Ave., Apt. A–6,
Norwalk, Conn. 06850
Filed Aug. 23, 1963, Ser. No. 304,076
6 Claims. (Cl. 62—58)

This invention relates to desalinization and, more particularly, to improved method and apparatus for the desalinization of sea-water.

Over the past few years, as population density has increased, the need for additional fresh water sources has increased proportionately. Already a number of communities have been faced with periods of drought during which water usage has been severely curtailed and, in many such instances, it has been necessary to bring water into the area from other localities. Ironically, many of these shortages have occurred within sight of the world's largest reservoirs, the oceans. For these reasons, more and more attention is being directed to the perfection of techniques for economically desalinizing sea water, and, in fact, several desalinization plants have been constructed.

Desalinization may be accomplished in at least two different ways: either by vaporization of the salt water, followed by condensation of the vapor, or by a freezing technique. Freeze desalinization depends on the fact that, as salt water is lowered in temperature, fresh water ice crystals begin to form and separate themselves from the remaining brine. If this ice is removed and melted, fresh water may be thereby collected. Desalinization by freezing has considerable economic potential. As only low temperatures are involved, the scaling and corrosion problems inherent in a heat process are minimized, and inexpensive materials may therefore be used in construction.

In spite of these potential advantages, freeze desalinization has also been characterized by various drawbacks which have impeded its development. One of the most important of these drawbacks lies in the satisfactory separation of the fresh water ice from the brine. In vaporization processes, the vapor may be condensed at a considerable distance from the brine, leaving the condensate completely salt-free. However, in freeze processes, the fresh water ice and the brine are intimately commingled and must be separated. The mere mechanical removal of the ice crystals from the brine is not sufficient to provide a source of potable water. Ice which is formed by freezing is contaminated with brine upon its exterior surface and in various interstices within the crystals. When such crystals are melted, the resulting water, although reduced in salt content, is still not suitable for drinking purposes. In prior art processes, it has been proposed to rinse the ice with fresh water or with water of lower saline content to remove this excess brine. Although this is a satisfactory expedient for removing the brine, it greatly reduces the overall efficiency of the plant, as much of the water which would otherwise be usable must be recycled to the rinsing operation.

An additional problem in prior art freeze desalinization lies in the mechanical separation of the ice from the concentrated brine. A number of expedients have been attempted to solve this problem, but these have customarily required the employment of special or complex machinery and often the introduction of a manual step into the process, thereby reducing the overall efficiency. It has been proposed, for example, to form solid masses of ice which would then be cut up and placed on a conveyor for an air rinsing operation. Other proposed methods involve freezing of ice against a cold surface which is then scraped, separation by centrifuges, separation on screen conveyors, and similar techniques.

Accordingly, it is a primary object of the present invention to provide an improved freeze desalinization process which is more economical than those heretofore proposed. Other objects are to provide such a process which does not require the use of fresh water for rinsing, which does not require the use of expensive and unusual mechanical separation equipment, and to provide such a process which is thermodynamically efficient. The manner in which the foregoing objects are achieved will be more apparent from the following description, the appended claims, and the single figure of the drawing which is a flow sheet of a process embodying this invention in which reference is made to a typical set of conditions.

In the present invention, the temperature of a volume of sea-water is lowered until ice crystals begin to form, thereby creating a sludge. The brine itself is then used as a conducting medium to transfer the ice crystals to a rotary vacuum filter of a type known in the prior art. The filter, however, serves a dual purpose in that it both mechanically separates the ice crystals from the brine solution and also creates an air flow across the separated ice crystals which causes slight surface melting and thereby rinses the brine from them. In addition to these features, various novel heat exchange techniques are employed for achieving maximum thermodynamic efficiency.

In the diagram, there is illustrated a sea-water intake 10 for inducting sea-water at an assumed temperature of 70° F. The weight and temperature designations on the diagram refer to an assumed set of conditions approximating a typical operation in accordance with standard heat balance notation. This sea-water is passed through the coil 12 of a heat exchanger 14 where it is cooled by cold brine to a temperature of 60.5 degrees F. From the heat exchanger 14 the sea-water passes through a line 16 to a freeze chamber 18. A refrigeration coil 20 lowers the temperature of the sea-water to 25° F. At this temperature, a slush is formed of ice crystals 22 which rise to the top of the brine in the freeze chamber. The ice crystals 22, carried by some of the brine, then passes through an overflow discharge outlet 24 which conveys them to a rotary vacuum filter 26. The rotary vacuum filter 26 is of a type well known in the art and comprises a fine wire cloth filter screen 28 which passes in endless-belt fashion around rollers 30, 32 positioned in a filter tank 33. This assembly is completely enclosed and a vacuum line 34 is connected to partially evacuate the volume between the upper and lower horizontal runs of filter screen 28. An air cooling refrigeration coil 36 is positioned above the upper level of filter screen 28 and a hood 40 including an intake air manifold 38 and an intake air line 42 is also provided. As the filter screen 28 is caused to rotate by suitable driving means, the pressure differential existing between the inner and outer surface of the lower horizontal run of the screen causes the ice crystals 22 to adhere to the outer surface and thereby be lifted upwardly and out of the concentrated brine in the bottom of the filter tank. The screen proceeds in a clockwise direction, as indicated by the arrows. When the ice crystals proceed across the upper horizontal run of the filter screen 28 they are exposed to a downward flow of chilled air at 32° F., which flows from manifold 38 to vacuum line 34 as a result of the pressure differential across the screen. This air flow melts the surfaces of the crystals slightly so as to remove the residual brine remaining on the crystals and also flush any remaining salt deposits from them. A scraper 44 at the right hand end of the filter dislodges ice crystals from the filter screen and they pass into a melting box 46. The ice crystals which have fallen into melting box 46 are melted by the heat exchange coil 50 into fresh water which flows out of the melting box 46 through line 56 at a temperature of 96.5° F. This fresh water then passes through one more heat exchanger 58 where it is cooled in coil 60 and leaves the system at a temperature of 84° F.

Refrigeration cycle

The condenser side of a refrigeration compressor 48 passes compressed refrigerant through heat exchange coil 50 in the melting box 46 where it is cooled to approximately 96.6° F. The refrigerant, which may be ammonia or any other suitable medium such as Freon, then passes by way of line 52 to expansion valve 54. The expanded refrigerant then passes through the refrigeration coil 20 in the freeze chamber 18 where it absorbs heat from the contained sea water and then continues through the air-cooling refrigeration coil 36 in the rotary vacuum filter 26 before returning to the refrigeration compressor 48.

Brine cycle

The brine remaining in freeze chamber 18 after removal of the ice crystals 22 passes out of discharge line 62 at a temperature of 25° F. The brine passes through a control valve 64 which is adjusted in accordance with the rate of sea-water intake and the rate of ice formation to maintain the desired height of ice within the chamber 18. This brine then passes to the point where discharge line 62 connects with the vacuum pump discharge 66. The vacuum pump 68 is a liquid ring rotary pump. At the point of intersection of line 62 and vacuum pump discharge 66, some heat is picked up by the brine due to the heat of compression in the vacuum pump and also due to the slightly higher temperature of the residual brine which drains from the vacuum filter 26, by line 70 and is also connected to the vacuum pump discharge 66. The final temperature of the brine as it passes into heat exchanger 14 is 26° F. It here cools the incoming seawater, as previously explained, and leaves heat exchanger 14 with a temperature of 55.5° F., passing to the heat exchanger 58 through line 72. In heat exchanger 58 the brine cools the outgoing fresh water and leaves the system by a brine discharge line 74 at a temperature of 82° F.

Air cycle

As has been explained, vacuum pump 68 is a liquid ring rotary type vacuum pump. Chilled water is used in the pump as a compressing medium. The vacuum line 34 is connected to the rotary vacuum filter 26 and the air and contained water which is removed from the filter is discharged by the vacuum pump 68 in a T 76 where the air and water are separated. The water is discharged through vacuum pump discharge line 66. The air passes through the intake air line 42 to the intake air manifold 38, as has been explained. Accordingly, the chilled air required for proper rinsing of the ice is re-used for maximum economy and efficiency. The air which passes to the manifold 38 under hood 40 is at a temperature of approximately 36° F.

It will be recognized by those skilled in the art that the present invention provides a number of advantageous results which have not been achieved by prior art devices. It will also be apparent that certain variations and modifications can be made in the described process without departing from the spirit and scope of this invention. For example, the efficiency of the system could be increased by using a two-stage refrigeration unit wherein the first stage would be used for melting the ice at 32° F. and the second stage would raise the temperature of the liquid refrigerant from 32° F. to 96.5° F. This would result in a closer correlation between the temperatures of the output fresh water and brine and the input sea-water. Other variations and modifications of the invention will also be apparent. For example, a drum type rotary vacuum filter could be employed in place of the "belt" type illustrated although the air exposure time of the ice crystals would then be somewhat reduced. Accordingly, it is to be understood that the method and apparatus of this invention is not to be construed as limited by the fore-going description. This description is illustrative only. The invention is limited only by the scope of the following claims.

What I claim as new and desire to secure by Letters Patent of the United States is:

1. A continuous desalinization process which comprises: extracting heat from saline water in a precooler by passing said saline water in heat exchanging relationship with cooled residual brine; passing the precooled saline water into a freeze chamber in heat exchanging relationship with the evaporated phase of a refrigerant to partially freeze said saline water and form a sludge of ice crystals floating in cooled residual brine; passing a first portion of said cooled residual brine to said precooler; bringing said ice crystals and a second portion of said cooled residual brine into intimate contact with the first side of a rotating filter screen; removing air from the second side of said rotating filter screen to create a pressure differential across said filter screen to attract said crystals thereto; rotating said filter screen to remove a portion of said screen and the attracted crystals thereon from said second portion of cooled residual brine; passing rinsing air across said attracted crystals and through said screen from its first to its second side; cooling said rinsing air to a temperature just above the melting temperature of said crystals to melt the surface of said crystals and remove salts therefrom; removing the remaining ice crystals from said screen and placing them in heat exchanging relationship with the compressed phase of said refrigerant to melt said crystals and form fresh water; and recycling the moisture laden air removed from the second side of said filter screen to function as at least a portion of said rinsing air so that the rinsing air will be of higher moisture content in order to insure washing of the crystals.

2. A continuous desalinization process which comprises: extracting heat from saline water in a precooler by passing said saline water in heat exchanging relationship with cooled residual brine; passing the precooled saline water into a freeze chamber in heat exchanging relationship with the evaporated phase of a refrigerant to partially freeze said saline water and form a sludge of ice crystals floating in cooled residual brine; passing a first portion of said cooled residual brine to said precooler; bringing said ice crystals and a second portion of said cooled residual brine into intimate contact with the first side of a rotating filter screen; removing air from the second side of said rotating filter screen by means of a water seal rotary vacuum pump to create a pressure differential across said filter screen to attract said crystals thereto; separating the discharged pump sealing water from the outlet moisture laden air from said pump; passing said discharged sealing water to said precooler in commingling relationship with said first portion of cooled residual brine; rotating said filter screen to remove a portion of said screen and the attracted crystals thereon from said second portion of cooled residual brine; passing rinsing air across said attracted crystals and through said screen from its first to its second side; recirculating the outlet moisture laden air from said pump and including it as a portion of said rinsing air; cooling said rinsing air prior to its passage across said crystals to a temperature just above the melting point of said crystals to melt the surface of said crystals and remove salts therefrom; scraping the remaining ice crystals from said screen and placing them in heat exchanging relationship with the compressed phase of said refrigerant to melt said crystals and form fresh water; passing cooled residual brine from said precooler into a post cooling heat exchanger; and passing said fresh water through said post cooling heat exchanger in heat exchanging relationship with said residual brine to cool said fresh water.

3. Apparatus for recovering fresh water from saline water which comprises: freezing means for subjecting said saline water to partial freezing to form a sludge of ice crystals suspended therein; rotary vacuum filter means including a filter tank and a rotatable screen therein; means for passing said ice crystals and at least a portion of the suspending saline water to said filter tank; means for creating a pressure differential across said screen to cause said ice crystals to adhere thereto; means for rotating said filter to cause at least a portion of said screen and the crystals thereon to separate from said saline water; means for passing a rinsing fluid across the adhered crystals from the high to the low pressure side of said screen to melt the surface of said crystals and remove salts therefrom; means for recycling the rinsing fluid from the low pressure side of said screen, through said pressure differential creating means and back to the high pressure side of said screen; means for cooling the rinsing fluid to a temperature just above the melting temperature of the crystals, said cooling means being interposed between said passing means and said screen; means for removing the remaining ice crystals from said screen; and means for melting said crystals to form fresh water.

4. The apparatus of claim 3 wherein said means for creating a pressure differential is a vacuum pump.

5. The apparatus of claim 4 wherein said means for passing a rinsing fluid is a fluid distributor connected to the output of said vacuum pump.

6. Apparatus for recovering fresh water from saline water which comprises: precooler means arranged to receive saline water therethrough in heat exchange relationship with cooled residual brine; a freeze chamber; means for passing precooled saline water into said freeze chamber; freezing coil means in said freeze chamber containing the evaporated phase of a refrigerant in heat absorbing relationship with said saline water to partially freeze said saline water and form a sludge of ice crystals floating in cooled residual brine; means for passing a first portion of cooled residual brine to said precooler means; rotary vacuum filter means including a filter tank and a rotatable screen therein; fluid passage means arranged to pass said ice crystals and a second portion of said cooled residual brine to said filter tank and into contact with a first side of said rotatable screen; water seal vacuum pump means connected to remove air from a second side of said rotatable screen to create a pressure differential across said filter screen to attract said crystals thereto; separating means for separating the discharged pump sealing water from the outlet air from said pump; fluid passage defining means connected to pass said discharged sealing water to said precooler in commingling relationship with said first portion of cooled residual brine; means for rotating said filter screen to remove a portion of said screen and the crystals thereon from said second portion of cooled residual brine; air passage defining means connected to receive outlet moisture laden air from said pump and impinge said air against said moisture laden crystals and through said screen from its first to its second side; cooling means disposed between said air passage defining means and said first side of said rotatable screen for cooling the impinging air to a temperature above the melting point of said crystals to melt the surface of said crystals and rinse salts therefrom; scraper means positioned to scrape rinsed ice crystals from said screen; melting chamber means positioned to receive said scraper crystals; warming coil means within said melting chamber containing the compressed phase of said refrigerant in heating relationship to said crystals to melt said crystals and form fresh water; a post cooling means; means for passing cooled residual brine from said precooler means into said post cooling means; and means for passing fresh water from said melting chamber through said post cooling means in heat exchanging relationship with said residual brine to cool said fresh water.

References Cited

UNITED STATES PATENTS

| | | | |
|---|---|---|---|
| 2,670,083 | 2/1954 | McKay | 62—58 X |
| 2,821,304 | 1/1958 | Zarchin | 62—58 |
| 2,904,412 | 9/1959 | McBride. | |
| 3,098,735 | 9/1963 | Clark | 62—58 |
| 3,102,908 | 9/1963 | Raynes. | |
| 3,121,626 | 2/1964 | Zarchin | 62—58 |
| 3,132,096 | 5/1964 | Walton | 62—58 X |

FOREIGN PATENTS 841,374   7/1960   Great Britain.

NORMAN YUDKOFF, *Primary Examiner.*